(12) United States Patent
Kuckes

(10) Patent No.: US 10,316,642 B2
(45) Date of Patent: Jun. 11, 2019

(54) TOOL FACE ORIENTATION SYSTEM FOR DRILLING BOREHOLES

(71) Applicant: Vector Magnetics, LLC, Ithaca, NY (US)

(72) Inventor: Arthur F. Kuckes, Ithaca, NY (US)

(73) Assignee: Vector Magnetics, LLC, Ithaca, NY (US)

( * ) Notice: Subject to any disclaimer, the term of this patent is extended or adjusted under 35 U.S.C. 154(b) by 68 days.

(21) Appl. No.: 15/355,486

(22) Filed: Nov. 18, 2016

(65) Prior Publication Data

US 2017/0138174 A1    May 18, 2017

Related U.S. Application Data

(60) Provisional application No. 62/256,772, filed on Nov. 18, 2015.

(51) Int. Cl.

| E21B 47/024 | (2006.01) |
|---|---|
| E21B 7/04 | (2006.01) |
| E21B 7/06 | (2006.01) |
| E21B 7/00 | (2006.01) |
| G01V 3/26 | (2006.01) |

(52) U.S. Cl.
CPC ............ *E21B 47/024* (2013.01); *E21B 7/002* (2013.01); *E21B 7/046* (2013.01); *E21B 7/067* (2013.01); *G01V 3/26* (2013.01)

(58) Field of Classification Search
CPC ........ E21B 47/024; E21B 7/046; E21B 7/067; E21B 7/002; G01V 3/26
See application file for complete search history.

(56) References Cited

U.S. PATENT DOCUMENTS

| 2003/0085059 A1* | 5/2003 | Kuckes | E21B 7/068 175/45 |
|---|---|---|---|
| 2011/0005838 A1* | 1/2011 | Granberg | E21B 4/14 175/61 |
| 2013/0014992 A1* | 1/2013 | Sharp | E21B 47/024 175/45 |

* cited by examiner

*Primary Examiner* — Brad Harcourt
(74) *Attorney, Agent, or Firm* — Brown & Michaels, PC

(57) ABSTRACT

The present invention is directed to tracking a borehole drilling direction and magnetic azimuth and orienting the tool face which controls the direction of drilling in a generally horizontal path between a specified borehole entry point and a predetermined exit location. The generally horizontal path may be disposed under a geographic obstacle such as a river, a highway, a railroad, or an airport runway wherein the ground above the borehole is difficult or impossible to access.

17 Claims, 10 Drawing Sheets

Fig 2 down hole drilling assembly g, EF, and north are all perpendicular to east dd is a horizontal projection of z, thus z lies directly below dd

TOOL FACE ORIENTATION SYSTEM FOR DRILLING BOREHOLES

BACKGROUND OF THE INVENTION

The present invention relates to borehole drilling, and particularly to determining and controlling the drilling direction of a borehole between specified borehole entry and exit locations.

From time to time, pipelines, wirelines (e.g., power transmission lines, fiber optic cables, communication lines, etc.), or other such facilities must be installed in locations where they must cross an obstacle (e.g., structures such as railroad tracks, highways, rivers, etc.) because the ground above the borehole is difficult or impossible to access, and/or the obstacle cannot be removed or relocated. Thus, various drilling techniques have been used to install pipelines and/or wirelines underneath these obstacles.

Specifically, a drilling apparatus is employed to tunnel a borehole underneath the obstacle from a specified entry point to a specified exit location in order to safely traverse the existing obstacle. After the tunnel is completed, the borehole may receive a casing that accommodates the pipeline or cable(s). Importantly, the borehole tunnel must maintain a certain clearance, or distance, from the preexisting obstacle so that the borehole tunnel does not interfere with, or otherwise damage, the preexisting structure. In other words, the drilling process must be carefully controlled so that the drill bit and the associated drilling means follows a prescribed drilling right-of-way (i.e., route) interconnecting a predetermined tunnel entry point and a predetermined tunnel exit point. The borehole must therefore remain within this drilling right-of-way as it passes under the obstacle and emerges (at or very near the predetermined exit point) on the other side of the obstacle.

In one approach that has been considered, a directional (e.g., horizontal) borehole can be drilled by a conventional directional drilling system. This conventional system may include a drilling tool having a motor disposed down-hole and operatively connected to a bent drill housing. The bent housing is, in turn, mounted on the lower end of a string of drill rods or tubing. The drill bit (tool) is rotatably mounted on the lower end of the bent housing and is driven by a down-hole motor. The drilling motor is typically powered by a viscous fluid that is directed down the inside of the drill rods or tubing. The bent housing has an upper section and a lower section. One end of the bent housing is connected to the down-hole motor housing, while the distal end is connected to a drill rod, typically approximately 1.5 meters long. The drill rod extends away from the housing at a small angle (e.g., 2-3 degrees from the borehole axis) and is connected to the drill bit. The bent housing causes the drill to swing at an arc when it rotates; and thus, the rotational motion must be controlled from the surface. The majority of the drilling power is provided by the down-hole motor. To provide straight ahead drilling, the bent housing, the motor housing and the drill rods are rotated continuously by a motor on the drill floor at the Earth's surface. To change the direction of drilling, the roll angle of the drill rods is held fixed at the surface, while the drill bit is powered solely by the stator in the hydraulic down-hole motor. It is imperative that the roll angle orientation of the bent lower section be known and controllable. The roll angle orientation of the bent section is known relative to the hydraulic down-hole motor (since the two elements are coupled together). In addition, a down-hole electronic "measurement while drilling" (MWD) package is fastened inside a non-magnetic section of drill rod just above the motor. Accordingly, the roll angle orientation, as well as the inclination and the azimuth of the borehole, are communicated to an up-hole control system by way of electrical signal wires or other communication system to the driller. The driller uses these data to adjust the drilling apparatus to drill straight ahead or along the specified curved path.

Accordingly, one of the drawbacks to this approach relates to the cost and complexity of placing and operating the down-hole system. The down-hole motor, the hydraulic drive system, and the electrical signaling infrastructure required to control the orientation of the drilling tool face can be expensive. Moreover, there is no guarantee that the above described control system provides the needed accuracy.

Another system utilizes a system of dual coaxial drilling rods which includes an inner set of rods whose sole function is to power the drilling bit. There is no down-hole drilling motor, all drilling power comes from rotating the inner drill rod at the surface. A second outer coaxial set of drills rods, independently rotatable from the inner set of drill rods, includes a 'bent sub' near the drill bit. The roll angle orientation of the "bent" sub controls the direction of drilling as with the down-hole motor system described above. With this system, rotation of the outer set of drill rods has the sole function of controlling the roll angle orientation of the bent sub near the drill bit. For straight ahead drilling, the outer drill rods, with the attached bent sub, are rotated at the same time as the inner rods, fastened to the drill bit, and rotated. To change the direction of drilling, the outer drill rod string is held fixed at the surface, thereby holding the roll angle of the bent sub steady. A difficulty in determining the bent sub orientation is that the many drill rod connections are usually screw connections with the relative orientation between the drill rods being unknown.

In such systems the current drill bit location and "bent" sub orientation are typically determined using a "walk over" system. These systems often consist of a simple down-hole electronic transmitter package attached to the outer set of drill rods near the drill bit which transmits an electromagnetic signal with encoded data to a person carrying a receiver who walks back and forth directly above the transmitter. While simple, these systems have limited range vertically and cannot be used in many circumstance where accessibility to the required surface location to make the measurements is not possible What is needed, therefore, is a method and apparatus that obviates the difficulties identified above. Specifically, a self-contained in the down-hole method and apparatus are needed for controlling and guiding the drilling of a borehole with increased precision and accuracy. This package must also allow simultaneous determination of drill face orientation direction as well as drilling azimuth and inclination.

SUMMARY OF THE INVENTION

The present invention addresses the needs described above by obviating the drawbacks identified above. The present invention is configured to control and guide the drilling of a borehole using a dual drill rod method with increased precision and accuracy using a self-contained down-hole package. Moreover, the present invention is configured to orient the drill face (e.g., of a bent drill housing) using a magnetic method while simultaneously preserving the ability to determine the magnetic azimuth of the drilling direction. The down-hole measurements are made using a standard MWD electronic package. The present invention provides an up-hole method and apparatus that guides the drilling of a borehole in a generally horizontal path so that it accurately traverses a prescribed path under a geographic obstacle.

To be specific, the present invention is directed to tracking a borehole that is being drilled in a generally horizontal path between a specified borehole entry point and a predetermined exit location. The generally horizontal path may be disposed under a geographic obstacle such a river, a highway, a railroad, or an airport runway wherein the ground above the borehole is difficult or impossible to access.

Those skilled in the art will appreciate that the method and apparatus of the present invention can readily and easily be adapted to the drilling guidance, tracking and surveying of any or most boreholes and, thus, the present invention should not be construed as being limited to approximately horizontal well bores.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
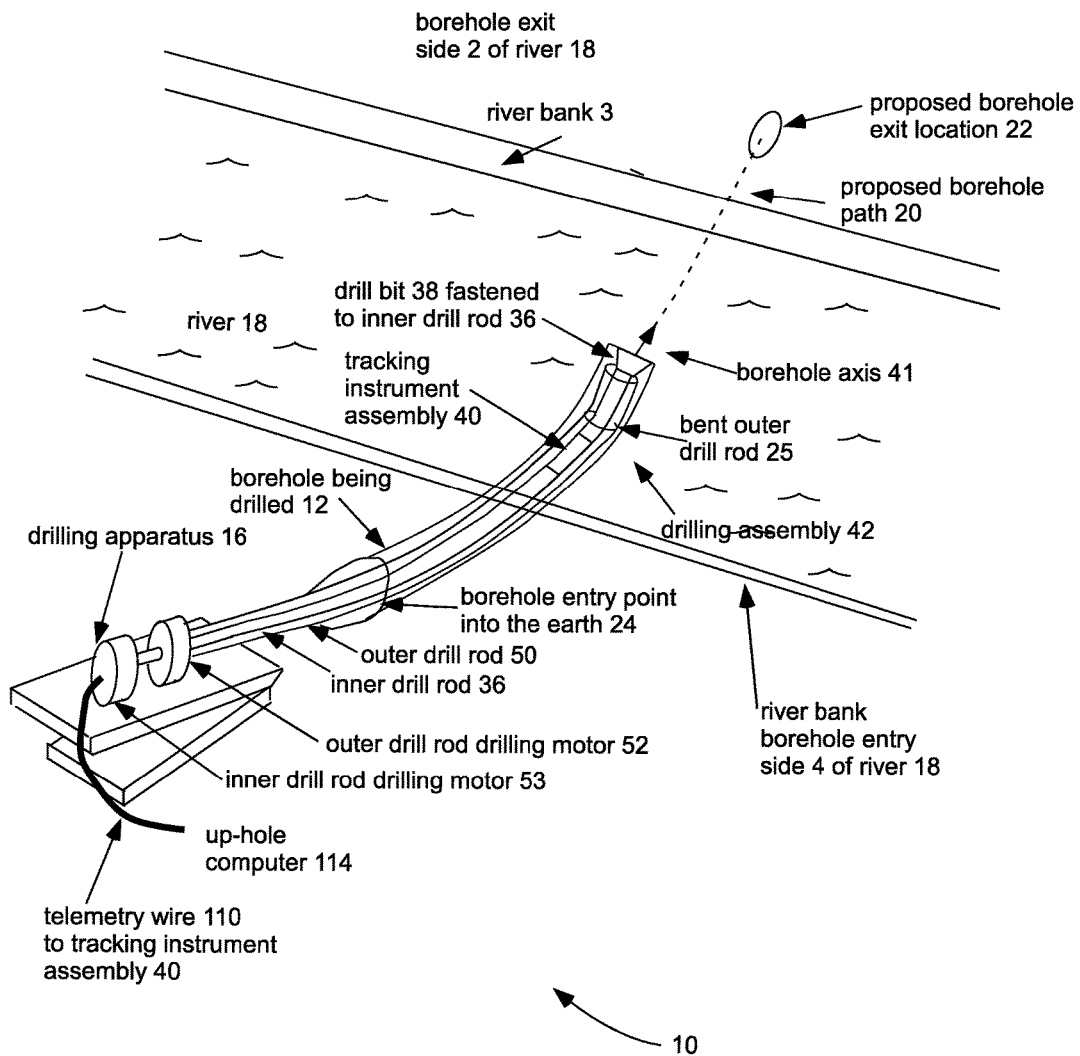
FIG. 1 is a diagrammatic depiction of a tunneled borehole following a prescribed path under the direction of the tracking system of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the tracking system of the present invention is shown in FIG. 1, and is designated generally throughout by reference numeral 10.

The present invention provides a system 10 that includes a down-hole apparatus mounted on a dual rod drill string (36, 50) near the drill bit 38 for setting the drilling tool face and guiding a borehole drilling operation (in an approximately horizontal direction). The down hole portion 40 of the apparatus consists of a pair of permanent magnets 54 mounted on an outer drilling rod 50 of a dual (concentric) rod drilling apparatus. The inner drill rod part of the down hole portion 40 includes a three vector component gravity sensing module 138 and a three vector component magnetic field sensing module 137. The apparatus 40 is configured to control the roll angle of the outer drill rod 50 to a known angle with respect to the borehole "high side" direction. (The meaning of "high side" is defined below). The outer drill rod 50 includes a "bent sub" 25 near the drill bit 38 whose rotational orientation controls the direction of drilling. The method of the present invention uses gravity and magnetic sensor data while a drilling tool is mounted on the inner drill rod 36 to determine: (1) the roll angle of two magnets mounted on the outer drill rod 50; (2) the Earth Magnetic field vector (EF); (3) the borehole inclination (INC); (4) the roll angle of the inner drill rod; and (5) the azimuth of the drilling direction and tool face orientation.

As embodied herein, and depicted in FIG. 1, a diagrammatic depiction of a tunneled borehole following a prescribed path under the direction of the tracking system 10 of the present invention is disclosed. Specifically, FIG. 1 shows a generally horizontal borehole 12 that is following a prescribed path 20 under the direction of the tracking system 10 of the present invention. In this view, the borehole 12 is being tunneled under an obstacle (e.g., river 18) in order to install, e.g., a pipeline, power transmission lines, fiber optic cables, communication lines, etc. The tracking system 10 is configured to guide the drilling apparatus 16 such that the drilling follows a predetermined path 20 at a predetermined vertical depth (e.g., about 30 meters) to a planned exit location 22. The predetermined path may traverse a great distance, e.g., 1,000 meters, 2-3 miles, etc.

The drilling apparatus 16 may be configured to drive concentric drill rods (50, 36) and thus includes two drill rig motors 52 and 53 that are coupled to the inner drill rods 36 and outer drill rods 50, respectively. (The principles of the present invention should not be construed as being limited to a concentric drill rod arrangement). The drill bit 38 is connected to the inner drill rod 36 which drives the drill bit, causing it to traverse the path under the river 18. The inner drill rod 36 is powered by the inner drill rod motor 53 located up-hole (i.e., at the surface). The outer drill rod 50 is coupled to the bent sub 25, which controls the direction of drilling 41. The drill bit 38 is shown as being disposed within the bent sub (outer drill rod) 25. The outer drill rod 50 is powered by a second motor 52 which is also located up-hole. The central longitudinal borehole axis 141 is substantially the same as the central longitudinal axis 141 of the concentric tubing comprising drill rods (37, 51) precisely because drill bit 38 forms the borehole.

The system 10 includes a telemetry wire 110 disposed between a down-hole portion of the system (i.e., tracking instrument package 40) and an up-hole portion of the system (up-hole control system 114); the telemetry wire 110 interconnects the up-hole and down-hole portions via the drilling apparatus 16 and the main inner drill rod 36.

Figure 2:
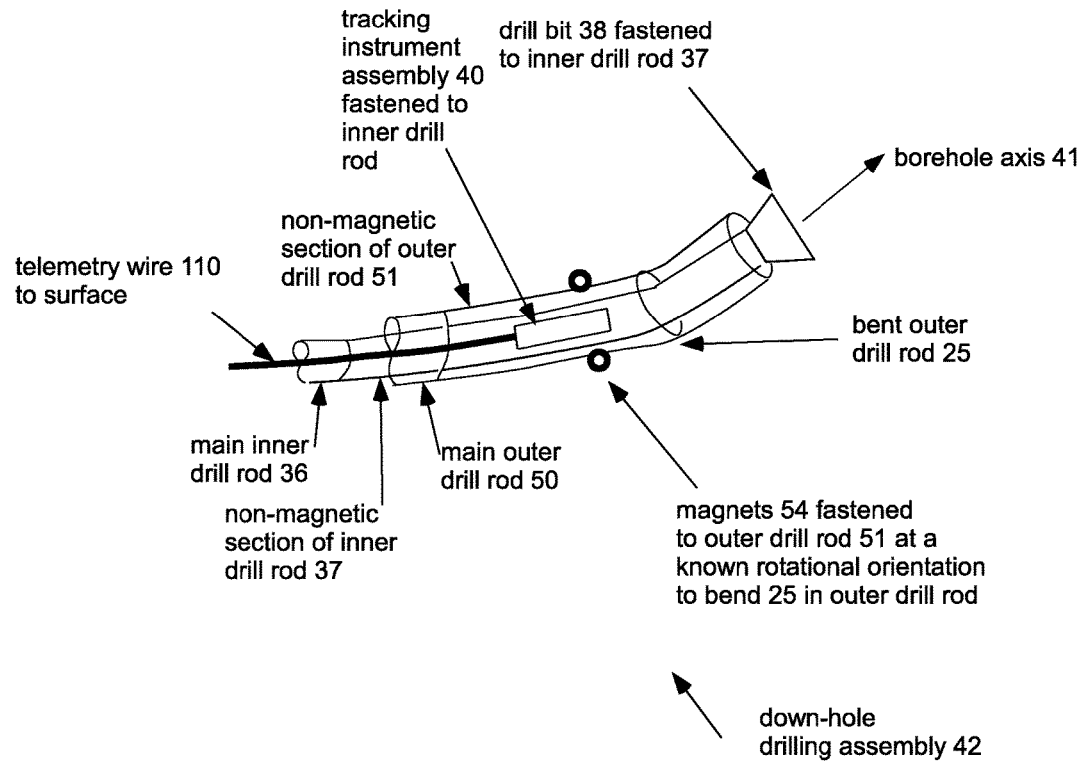
FIG. 2 is a diagrammatic depiction of the down-hole drilling assembly in accordance with an embodiment of the present invention.

As embodied herein and depicted in FIG. 2, a diagrammatic depiction of the down-hole drilling assembly 42 is disclosed in accordance with an embodiment of the present invention. As noted above, the drilling system features a concentric pipe system that includes inner drill rod 36 disposed within the outer drill rod 50. The inner drill rod 36 is coupled to a non-magnetic inner drill rod section 37; and the non-magnetic the drill rod section 37 is connected to the drill bit 38. Similarly, the outer portion of the concentric tubing includes the outer drill rod 50 connected to a non-magnetic outer drill rod 51, which in turn, is coupled to the bent sub 25.

Figure 13:
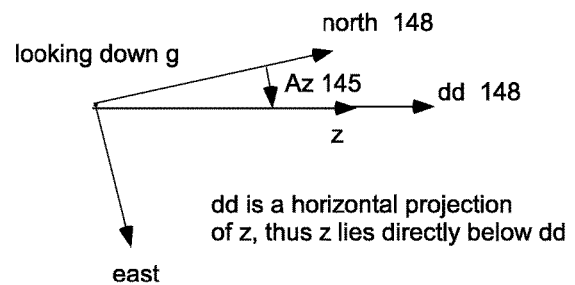
FIG. 13 is a detailed diagrammatic depiction showing the relationship between various vector elements used for computing the horizontal drilling direction in accordance with an embodiment of the invention.

The tracking assembly 40 is shown mounted inside the non-magnetic the drill rod section 37 (which is disposed inside the outer non-magnetic drill rod section 51). The telemetry wire 110 extends from the tracking assembly 40 and through the inner rods (36, 37) until it is coupled to the up-hole control system 114. (Note that the down-hole system 42 does not include or employ any down-hole motor to drive the drill bit 38 rotation). The tracking assembly 40 is configured to be magnetically coupled to orientation magnets 54, which are coupled to the outer non-magnetic drill rod section 51. To be specific, the magnets 54 are fastened to the outer nonmagnetic drill rod section 51 at a known location relative to the bent sub 25 and the tracking assembly 40. With the orientation of the bent sub known by the control system 114, the drilling apparatus can precisely control the drill bit 38 direction (azimuthally and inclinational). (See FIG. 10 and FIG. 13).

FIG. 2 shows the down-hole drilling assembly 42 in situ, i.e., in the borehole 12. The instrument assembly 40 is disposed at some inclination angle and roll angle. Moreover, the sensor assembly 40 is disposed substantially in-line with the drill bit 38 (which establishes the drilling direction). FIGS. 6-13 graphically illustrate how the up-hole system 114 manipulates the sensor data provided by the tracking instrument assembly 40 to calculate the azimuthal direction data, the inclination of the sensor assembly 40 down-hole, the inner drill rod roll angle, the outer drill rod roll angle and the azimuthal drilling direction.

Figure 3:
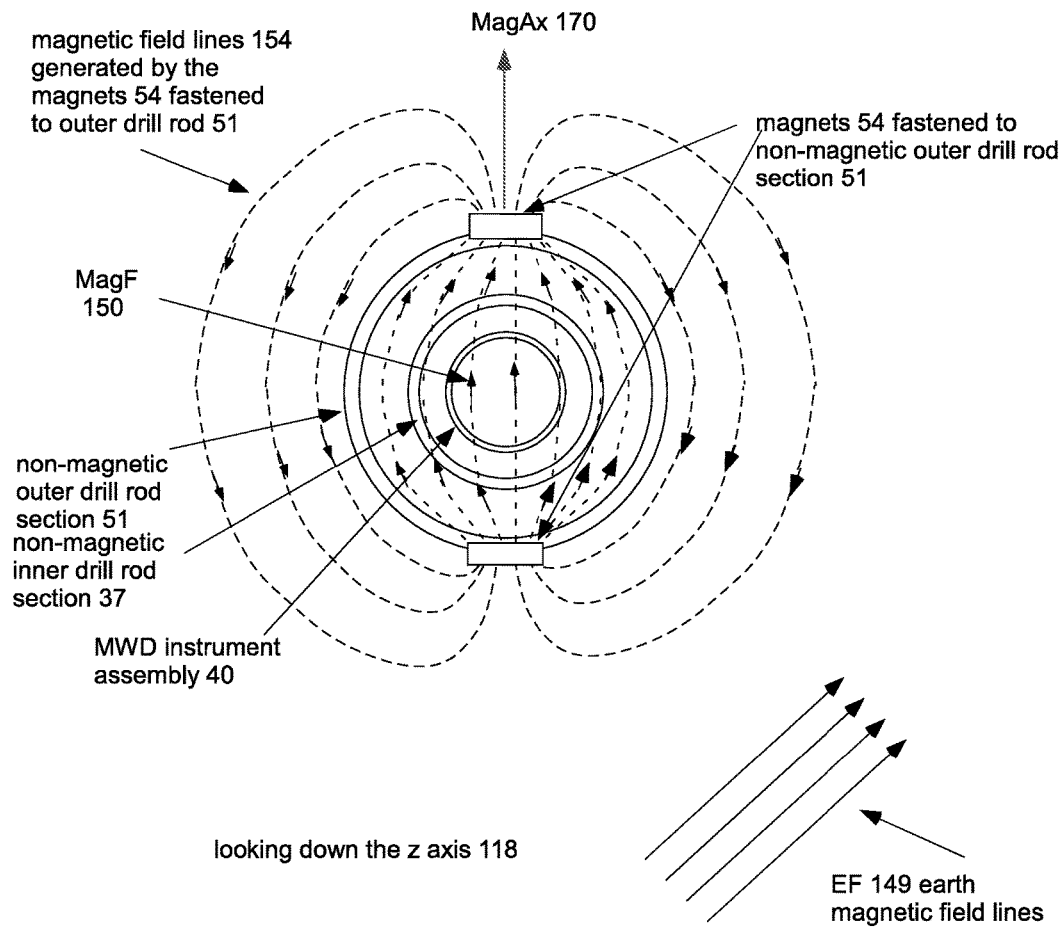
FIG. 3 is a cross-sectional view of the concentric drill rods disposed within a magnetic field in accordance with an embodiment of the present invention.

In reference to FIG. 3, a cross-sectional view of the concentric drill rods (37, 51) disposed within a magnetic field is disclosed. One magnet 54 is fastened to the non magnetic outer drill rod section 51 at 0° (bisected by the magnetic axis (MagAx 170) and the second magnet is fastened to the non-magnetic drill rod section 51 at 180°. The non-magnetic inner drill rod section 37 is disposed within the non-magnetic outer drill rod section 51, and the sensor assembly 40 is disposed within the inner drill rod section 37. Note that the magnetic field established in and around the concentric tubing (37, 51) includes two components: the first component is magnetic field generated by the magnets 54; and the second component is the Earth's magnetic field (EF).

The magnets 54 establish "outer" magnetic field lines (MagF 154) that extend from the exterior of surface of the upper magnet 54 (at 0°) to the exterior surface of the lower magnet 54 (180°). The magnets 54 also establish "inner" magnetic field lines (MagF 150) that extend from the interior portion of the lower magnet 54 (180°), through the non-magnetic concentric tubing (37, 51), and terminate at the interior surface of the upper magnet 54 (at 0°), in the manner shown. The magnetic field 150 established at the interior of the non-magnetic concentric rods (37, 51) is relatively uniform and will rotate with any rotation of the outer drilling rod 50 (since the magnets 54 rotate with the outer drilling rod 50). The Earth's magnetic field vector EF is fixed with respect to the Earth. The Earth's magnetic field, near the magnetic sensors, is depicted in FIG. 3 as four (4) parallel lines for clarity of illustration: those of ordinary skill in the art will appreciate that the Earth magnetic field is also established in and around the concentric tubing (37, 51) and the sensor assembly 40.

Figure 4:
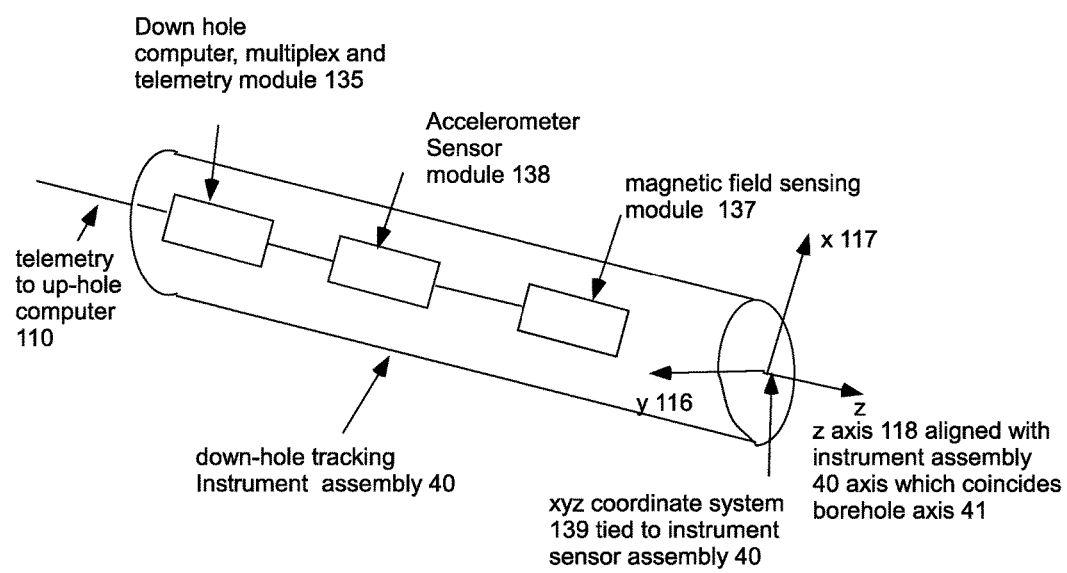
FIG. 4 is a block diagram of a down-hole instrument package in accordance with an embodiment of the present invention.

Referring to FIG. 4, a block diagram of a down-hole instrument package in accordance with an embodiment of the present invention is disclosed. The sensor instrument assembly 40 includes a three (3) vector component magnetic field sensing module 137 and a three (3) vector component gravity sensing module 138; both of these units are coupled to a down hole processing/telemetry unit 135. A right handed Cartesian (xyz) coordinate system is established relative to the instrument package 40 for orientation and computational purposes. For example, the z-axis of the right handed Cartesian coordinate system is the central longitudinal axis of assembly 40 and further corresponds to the borehole axis. The x-axis and the y-axis unit vectors are also fixed to the instrument assembly 40. The gravity and magnetic field sensors (137, 138) generate sensor voltage data that is conditioned by the down-hole processing/telemetry unit 135. In one embodiment, the sensor assembly 40 is configured to provide output voltages proportional to the x, y and z components of gravity and the composite magnetic field (See FIG. 3).

Figure 5:
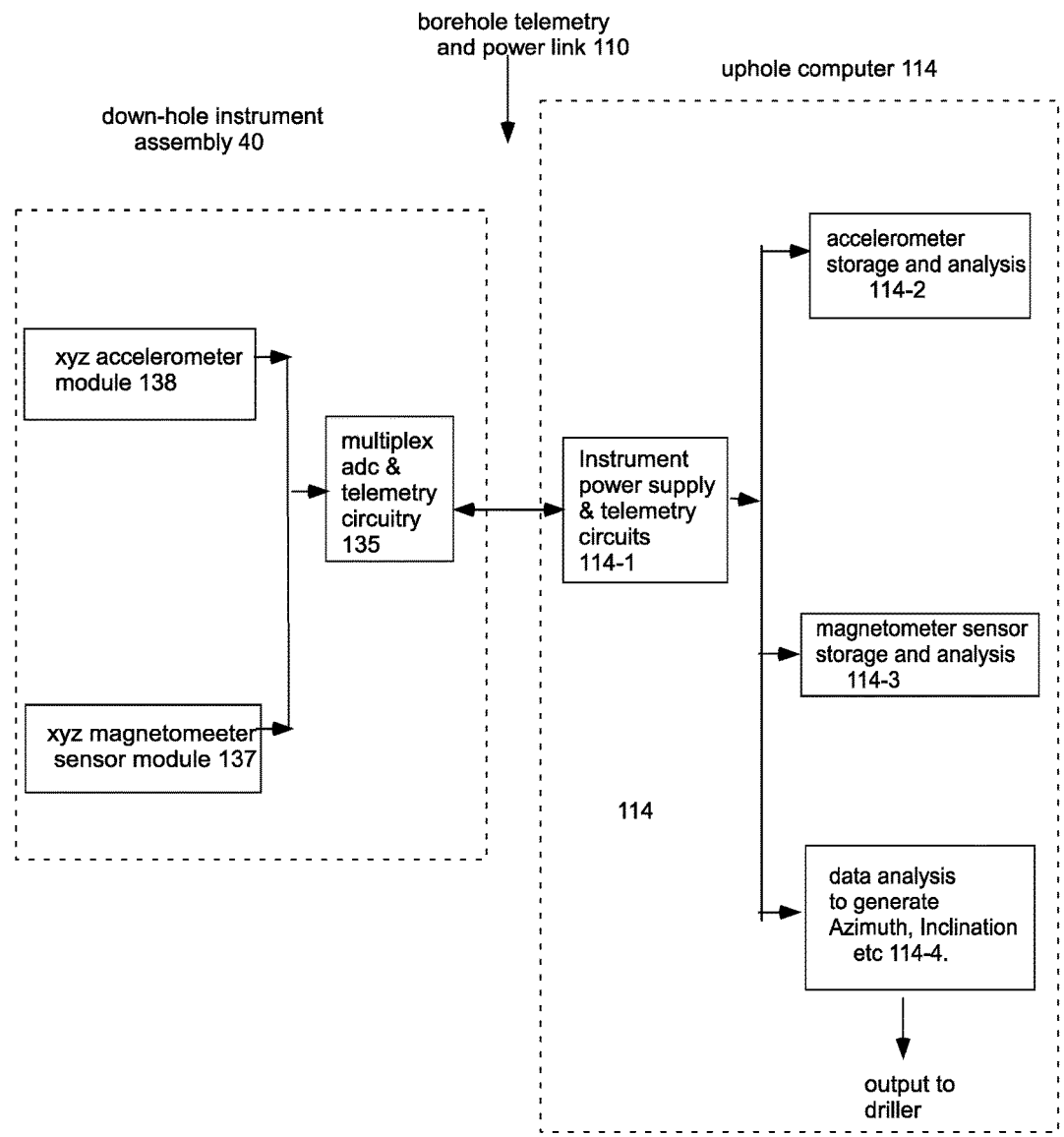
FIG. 5 is a block diagram showing the down-hole instrument package interconnected with an up-hole computer in accordance with an embodiment of the present invention.

As embodied herein, and depicted in FIG. 5, a block diagram showing the down-hole instrument package 40 connected to an up-hole computer 114 by telemetry link 110 is disclosed. The telemetry link 110 provides the down-hole assembly 40 with a suitable power supply and a data communications link that provides two-way communication between the up-hole system 114 and the down-hole system 40. The borehole telemetry wire 110 may be configured to transmit data to the up-hole unit 114 using any suitable means, i.e. digital signals sent on a wire installed in the drill pipe, by drilling fluid pressure pulses, by electric current pulses flowing on the drill stem itself, or etc.

The down-hole sensor assembly 40 includes an interface assembly 135 that is coupled to the up-hole control system 114 by the telemetry link 110. The interface assembly 135 can include a processor (FIG. 4) with analog-to-digital conversion (ADC) capabilities; the processor is configured to convert analog sensor data into digital data for transmission over the data link portion of telemetry link 110. The digital data (including accelerometer 138 and magnetometer sensor 140 voltage outputs) may be encoded by the processor 135 using any suitable coding scheme or format for communication to the up-hole computer 114 via telemetry link 110.

The term "processor" is used herein to generally describe any suitable arrangement for processing the sensor data and transmitting that data to up-hole system 114. Moreover, the processor is further configured to respond to commands provided by up-hole system 114. Accordingly, those of ordinary skill in the art will appreciate that the processor 135 can be implemented in numerous ways to perform various functions discussed herein. For example, the processor may include one or more microprocessors that may be programmed using software (e.g., microcode) to perform various functions discussed herein. Alternatively, the processor may be implemented without employing a microprocessor, or the processor may be implemented using a combination of dedicated hardware to perform some functions and a processor that performs other functions. Examples of processor components that may be employed in various embodiments of the present disclosure include, but are not limited to, microprocessors, microcontrollers reduced instruction set computers (RISC), application specific integrated circuits (ASICs), field-programmable gate arrays (FPGAs) and the like.

The sensor assembly 40 also includes an accelerometer module 138 that is configured to provide an accelerometer output for each axis (x, y, and z). (As noted above, the present invention defines a right handed Cartesian coordinate system based on the sensor assembly 40). For example, the longitudinal axis of the sensor assembly—which corresponds to the borehole axis—is defined by the sensor processor 135 as the z-axis). Thus, the accelerometer module 138 includes an accelerometer sensor for each axis in the three-dimensional Cartesian system. Those skilled in the art will appreciate that any suitable accelerometer sensor may be employed to implement the accelerometers of the present invention. For example, capacitive accelerometers using, e.g., MEMS (micro-electrical-mechanical sensors) devices, are well known and widely employed in the accelerometer arts. These devices are configured to sense changes in the capacitance between microstructures; when these structures are moved by an acceleration force, the capacitance will change. The sensor is configured to convert the sensed capacitance into voltage, which is read by the down-hole processor 135. (Piezoelectric accelerometers are also widely used in the accelerometer arts. Piezo-sensors convert mechanical stress into a sensor voltage). In any event, those skilled in the art will appreciate that any suitable accelerometer sensor may be employed to implement the accelerometers of the present invention. The term "suitable" means that the accelerometer module 138 must be configured to accurately sense the three gravity direction (x, y, z) vector components at the down-hole location in accordance with the teachings of the present invention.

The sensor assembly 40 also includes a magnetometer module 137 that is configured to provide a magnetometer output for each axis (x, y, and z). Those skilled in the art will appreciate that any suitable magnetometer may be used to measure magnetic fields in accordance with the teachings of the present invention. (Magnetic fields are vector quantities characterized by both strength and direction). Thus, the present invention may be configured to employ solid state magnetometer sensors such as Hall-effect sensors, or flux gate sensors that detect the Earth's magnetic field along three perpendicular axes (x, y and z) of the Cartesian space. The Hall-effect sensor is configured to provide a sensor voltage that is proportional to the strength and polarity of the magnetic field along the unit vector axis (i.e., along the x, y or z axes). As before, processor 135 is configured to convert the sensed voltage into digital sensor signal that can be readily employed by the up-hole system 114. (In another embodiment, the magnetometer may be implemented using magneto-resistive devices; in this case, the resistance is a function of the magnetic field). Those skilled in the art will appreciate that any suitable magnetometer sensor may be employed to implement the magnetometer sensor module 137 of the present invention. In other words, the magnetometer sensor module 137 must be configured to accurately sense the composite magnetic field (i.e., the Earth field and the field generated by magnets 154) in accordance with the teachings of the present invention.

Referring again to FIG. 5, the various component modules of the up-hole system 114 are disclosed. The telemetry link 110 is coupled to instrument telemetry circuitry 114-1 disposed in the uphole system 114. The instrument telemetry circuitry 114-1 includes a power supply that may be configured to provide the sensor instrument assembly 40 with a suitable power supply (e.g. 24 VDC).

The up-hole computer 114 also includes a data analysis module 114-4. This module manipulates the sensor data provided by the down-hole tracking assembly 40 to calculate the azimuthal direction data, the direction of the magnetic field generated by the magnets on the outer drill rod and the down-hole unit inclination data. This information is transmitted to the driller 16 (FIG. 1) so that an appropriate course adjustments can be made as necessary.

System Operation and Data Acquisition

A convenient way of operating the system is to obtain sensor measurements when new drilling rod segments are added to the drilling string to extend the length of the borehole down the prescribed path 20 (FIG. 1). A new length or segment of concentric drilling rods (36, 50) is usually about 10 meters in length. In other words, the driller will obtain sensor data to determine if the drill bit is on course and oriented properly, make any needed corrections, and drill for about ten meters until a new ten (10) meter length of concentric drill rod (36, 50) is added to the existing drill rod string. At that point, the system may be "recalibrated" by obtaining new sensor readings of the Earth's vector magnetic field components at the new down-hole location.

Thus, the new sensor readings of the Earth's vector magnetic field components are obtained by driving the outer drill rod motor 52 to rotate the outer drill rod 50 by one or more complete revolutions. The rotation of the outer drill pipe 50 also rotates the magnet axis 170. (See FIG. 3). As described below, the rotation of the magnet axis allows the magnetometer to provide orthogonal voltage waveforms (referred to herein as the "high side" magnetic field vector component and the "right side" magnetic field vector component. The high side and the right side refer to orthogonal sides of the sensor assembly 40). Specifically, the rotation causes the voltage waveforms vary in accordance with a substantially sinusoidal pattern (FIG. 8) that is biased or offset by a certain amount. The bias amount corresponds to the Earth's magnetic field. Thus, by factoring out the high side bias and the right side bias from the total high side magnetic field and the total right side magnetic field, respectively, the magnetometer data analysis module 114-4 obtains the Earth field components and the magnetic field components generated by magnets 54 (FIG. 2). This procedure allows the up-hole control system 114 to continually update the orientation (i.e., roll angle) of the bent sub 25 (FIG. 2).

At the same time, new gravity measurements can be obtained from the accelerometer module 138. As explained herein, the gravity measurements provide the up-hole control system 114 with an updated borehole axis (z-axis) measurement, and the inclination and azimuthal angle (relative to North) of the sensor assembly 40.

Data Analysis

The data analysis of the acquired data is described below in conjunction with FIGS. 6-13. As a result of the data acquisition procedure—discussed above at a very high level—a set of measurements are obtained relative to the right handed Cartesian coordinate system defined above. The vector components (x, y, z) of the total magnetic field ("TotB") sensed by the magnetic sensor 137 are "TotBx," "TotBy" and "TotBz", respectively. Similarly, the vector components (x, y, z) of gravity (g) sensed by the accelerometer module 138 are "Gx," "Gy" and "Gz," respectively. Accordingly, the down-hole sensor assembly 40 provides six (6) output voltages proportional to these vector components (i.e., TotBx, TotBy, TotBz, Gx, Gy and Gz). The sensor assembly 40 is configured to sample the six (6) output voltage measurements at a relatively high rate so that the rotational effects of the sensor assembly 40 can be neglected. On the other hand, if the sampling rate is relatively low, compensation for the sensor assembly rotation (between sampling times) can be performed.

Once the magnetic field and gravity measurements are obtained from the magnetometer module 137 and the accelerometer module 138, respectively, these measurements are mathematically analyzed by the up-hole controller 114 in order to find the steering information (i.e., bent sub roll angle, borehole axis, inclination and azimuth, etc.).

Figure 6:
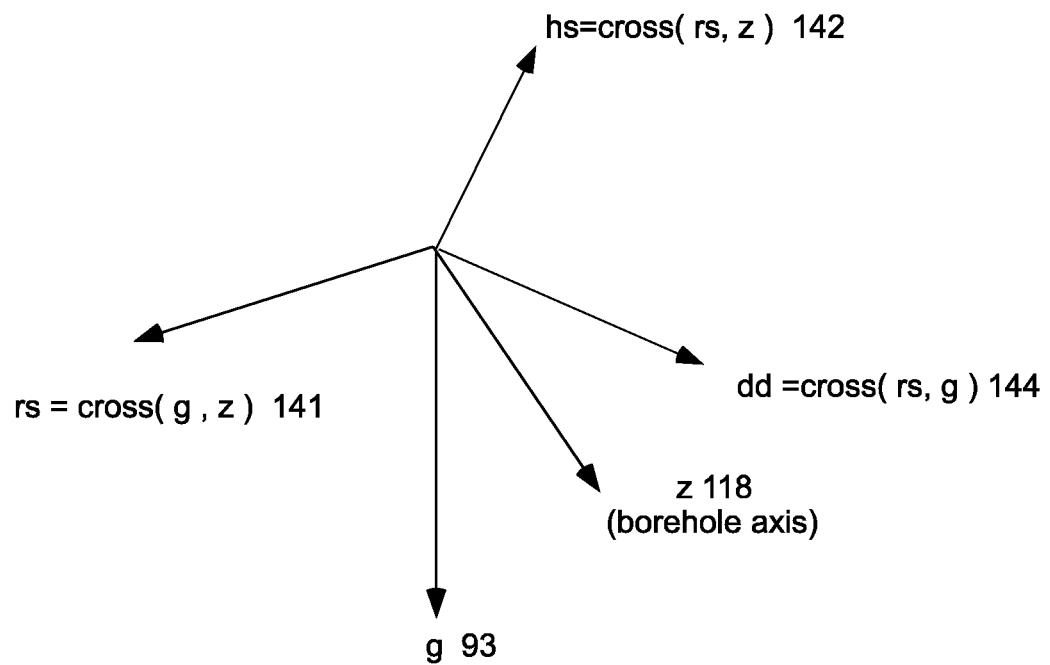
FIG. 6 is a diagrammatic depiction showing the relationship between various vectors in accordance with an embodiment of the present invention.

Referring now to FIG. 6, a diagrammatic depiction showing the relationship between various vectors in accordance with an embodiment of the present invention is disclosed. The vectors defined herein are used to mathematically and precisely define the parameters described above (e.g., roll angle, inclination, azimuth). As noted previously, the unit vector in the positive z-axis direction points along the borehole axis in the direction of drilling. Gravity (g) is normal to the Earth's surface and points toward the Earth's core. The "drilling direction" vector ("dd") is defined as the projection of the borehole axis (z-axis) onto the Earth's surface. The "right side" unit vector ("rs") is defined as the vector that is orthogonal to both gravity and the borehole axis; thus, when "looking down" the borehole (in the positive z direction), the rs unit vector is horizontal (relative to the Earth's surface) and points to the right from the sensor module 40. The "high side" unit vector ("hs") is defined as the vector that is orthogonal to the right side vector (rs) and the borehole axis (z). In other words, it is referred to herein as the high side vector because it points "up," i.e., it is perpendicular to the horizontal (rs vector). Briefly stated, the vectors defined above serve to spatially orient the sensor assembly to the Earth. The xyz coordinate system is fixed to the sensor assembly. Accordingly, the sensor 40 measurements made with reference to the xyz coordinate system fixed with respect to the instrument assembly can be readily converted to vector components that are referenced to the spatial coordinate system defined above.

Based on the qualitative descriptions provided above and shown in FIG. 6, the Rs vector can be mathematically written using the cross product of gravity vector G and the unit vector in the z-direction:

$$Rs = \text{cross}(G, z) \quad (1)$$

Where, G is the gravity vector which points vertically down. The right side vector Rs is orthogonal to both gravity G and the borehole axis (z); it is a horizontal vector pointing in the right hand direction looking down the borehole. The unit vector rs is obtained by dividing the vector quantity Rs by its magnitude, i.e., $$rs = Rs/|Rs| = (-Gx*y + Gy*x)/\text{sqrt}(Gx'2 + Gy'2) \quad (2)$$

rs is a unit vector associated with Rs. As described herein, vector quantities using only lower case letters represent unit vectors as exemplified above with the Rs and rs vectors. The gravity vector is represented by Gx, Gy and Gz in the Cartesian coordinate system. The bracket "| |" denotes vector magnitude of the vector between the brackets.

$$hs = \text{cross}(rs, z) = (-Gx*z - Gy*y)/\text{sqrt}(Gx'2 + Gy'2) \quad (3)$$

As explained above, the "high side" unit vector ("hs") is defined as the unit vector that is orthogonal to the right side unit vector (rs) and the borehole axis unit vector z. The high side unit vector (hs) is thus obtained by taking the cross product of the unit vector z and the unit rs vector as indicated by equation (3).

As those skilled in the art will appreciate, the dot product can be used to find the projected component of a first vector that extends in the direction of a second vector. Alternatively, this is often expressed as the projection of the first vector onto the second vector. If the second vector is a unit vector of a coordinate system, this projection is referred to as the appropriate vector component of the vector. Thus, hs, rs components of the total magnetic field vector TotB are the projection of the total magnetic field (TotB) onto the hs, rs directions, respectively. Expressed mathematically, the hs, rs and z vector components of the total magnetic field (TotB) vector are:

$$TotBhs = \text{dot}(TotB, hs) = (-Gx*TotBz - Gy*TotBy)/\text{sqrt}(Gx'2 + Gy'2) \quad (4)$$

$$TotBrs = \text{dot}(TotB, rs) = (-Gx*TotBy + Gy*TotBx)/\text{sqrt}(Gx'2 + Gy'2) \quad (5)$$

$$TotBz = \text{dot}(TotB, z) \quad (6)$$

It is to be noted that any 'abstract vector' such as the magnetic field vector TotB has "representations" in various coordinate systems. It is often convenient to formulate ideas in terms of abstract 'vectors' which are conducive to simple graphical portrayal. When doing numerical computations, a vector 'representation' with respect to a specified coordinate system is required. Thus while, for example, the dot product has a simple definition in terms of abstract vectors, to evaluate the dot product between two vectors such as in equations (4), (5), and (6) they must be represented in the same coordinate system. As explained above, sensor readings of the Earth's vector magnetic field components obtained from the sensor 40 are in an xyz representation. Equations (4), (5) and (6) effectively generate this magnetic field in terms of a hs, rs, z coordinate system from the xyz representation generated by the sensor 40.

Another point that should be kept in mind relates to the fact that equations (4), (5) and (6) show how to transform measurements made in the xyz system (which rotates with the inner drill rods) to a coordinate system which is stationary with respect to the Earth. Thus, these equations function to remove the rotation effects of the inner drill rod which carries the accelerometers to the borehole hs, rs, z coordinate system which is fixed to the Earth.

Figure 7:
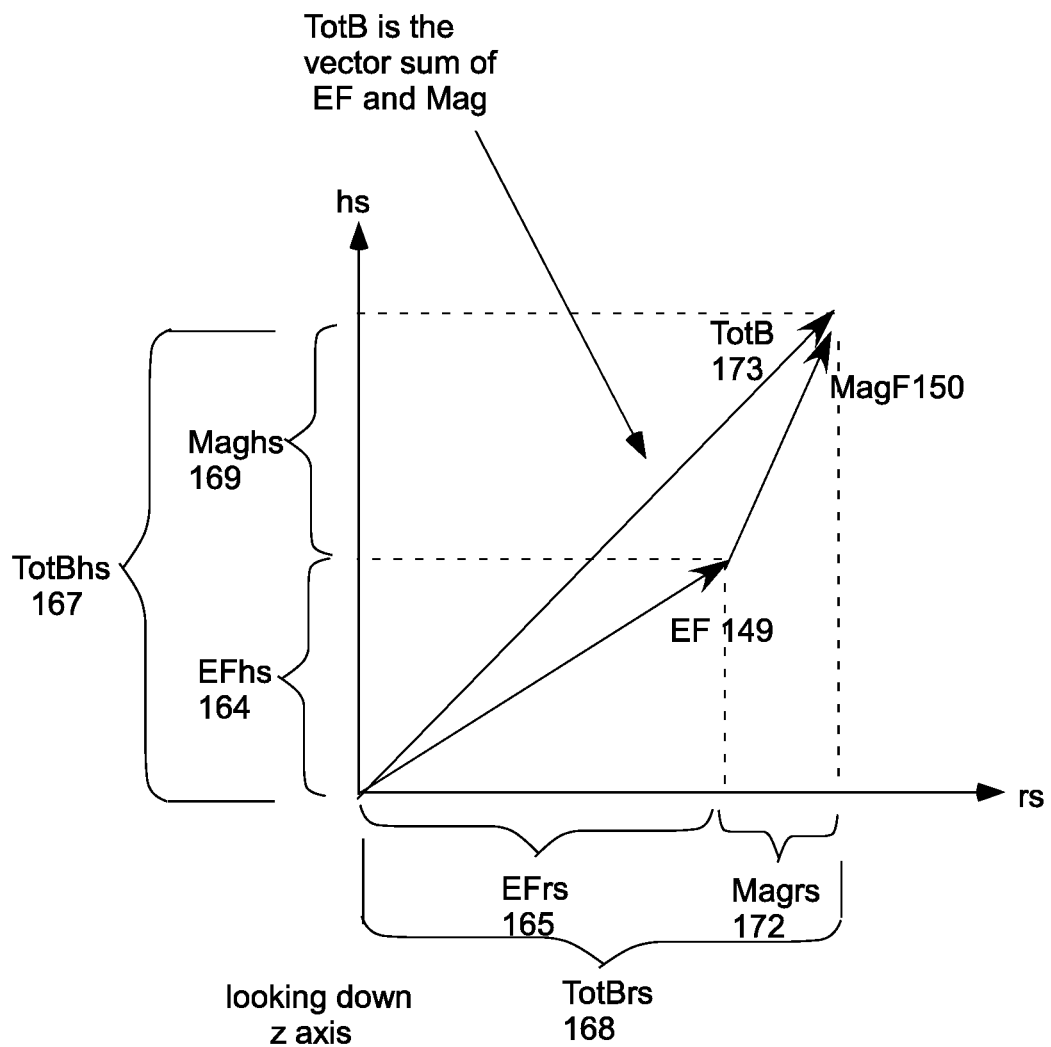
FIG. 7 is a diagrammatic depiction showing the relationship between the various magnetic field components in accordance with an embodiment of the present invention.

FIG. 7 is a diagrammatic depiction showing the relationship between the Earth magnetic field and the Magnet magnetic field vectors and their hs, rs components. The Earth magnetic field vector EF is fixed with respect to the Earth, and the magnet magnetic field MagF is tied to the outer drill rod (since the magnets 54 are fastened to the outer drill rod). Thus, MagF rotates when drill rod 54 is rotated. The vector components of the total magnetic field (TotB) are shown "projected onto" the plane defined by the unit right side vector (rs) and the unit high side vector (hs). Since hs and rs are orthogonal to z (equations 2-3), these unit vectors can be graphically depicted as a two-dimensional coordinate system with hs as the vertical axis and rs forming the horizontal axis. Note that this is a top view of the hs, rs plane "looking down" the z-axis into the page.

It is important to express the above mathematically. The total magnetic field (TotB) is the vector addition of the magnetic field vector (generated by magnets 54 (i.e., Mag 150)) and the Earth field (EF). As shown in FIG. 7, this vector sum can be written as:

$$TotB = EF + MagF \tag{7}$$

The vector components of EF and MagF add algebraically i.e.:

$$TotBhs = EFhs + Maghs \tag{8}$$

$$TotBrs = EFrs + Magrs \tag{9}$$

$$TotBz = EFz \tag{10}$$

In practice, the Earth Field components EFhs 164 and EFrs 165 are carried forward after a "calibration" when drilling continues. EFhs and EFrs do not change significantly while the borehole is drilled forward by a modest amount. Thus they can be subtracted from measurements of the Total Magnetic field vector (TotB) measurements obtained while drilling to determine the MagF vector and to update the orientation of the outer drill rod 50 and thus the bent sub 25. The system 10 is thus configured to obtain the vector components of the magnetic field (Maghs, Magrs) in order to continually update the roll angle of the bent sub 25 while drilling.

Figures 8A, 8B:
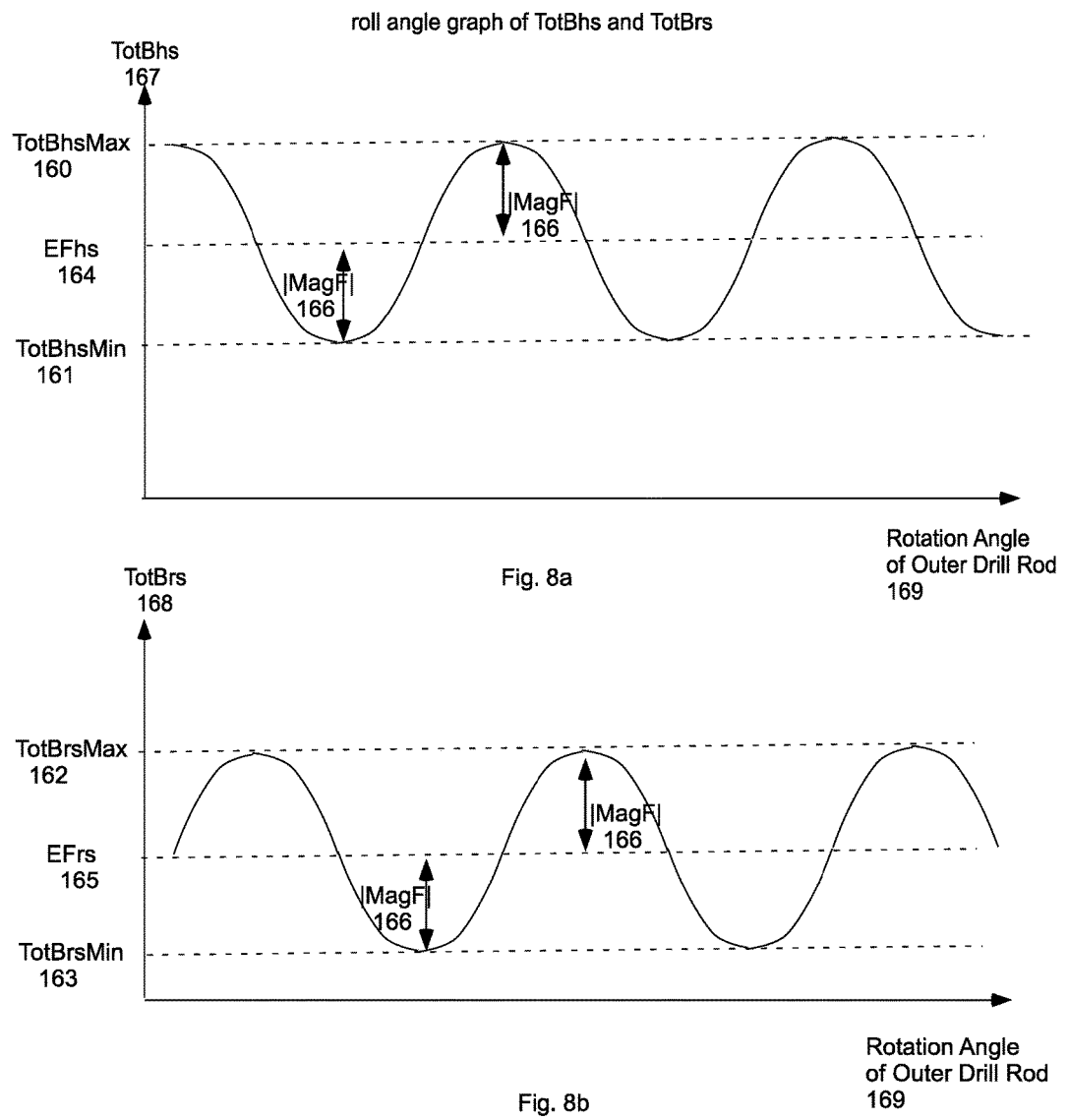
FIGS. 8A-8B are waveforms illustrating the variation of magnetic field components during drill rotation in accordance with an embodiment of the present invention.

Referring to FIGS. 8A-8B, waveforms illustrating the variation of magnetic field components during drill rotation are disclosed. To be specific, these waveforms show the variation of TotBhs and TotBrs as the outer drill rod 50 is rotated. One aspect of this invention is the recognition that the Earth field EF is fixed in space while the Magnet field MagF rotates with the magnets 54 (fixedly positioned on the outer drill rod). Moreover, the present invention also recognizes that the two fields (EF, MagF) can be separated from one another by rotating the outer drill rod and noting the variation of the field components.

FIGS. 8A-8B shows the variation of the hs and rs components of the total field components TotBhs and Totrs as the outer drill rod 50 is rotated a few complete revolutions. The rotation of the outer drill pipe 50 rotates the magnet axis Mag Axis 170 and the relatively uniform magnetic field MagF 150 at the magnetic sensor location about the z axis of the borehole (See FIG. 3). By noting the variation in the measured total B field high side vector component (TotBhs) and the total B field right side vector component (TotBrs), the high side ("EFhs") and right side ("EFrs") vector components of the Earth's magnetic field can be found as well as the magnitude of the magnet field |MagF|. The North and East directions can be derived from the Earth Field EFhs, EFrs and EFz vector components using the accelerometer measurements. See FIG. 9. The azimuth (Az) direction of the borehole axis is the angle from North to the drilling direction (dd) i.e., Anorthdd.

Turning to FIG. 8A, a plot of TotBhs (i.e., the Total magnetic field projected onto the high side unit vector) as a function of the outer drill rod rotation angle is disclosed. Because the magnets 54 are fixed to the outer drill rod 51, its magnetic field (MagF) will also rotate (as shown in FIG. 3). When MagF points in the high side (hs) direction, Maghs=|MagF|. The vector TotBhs has a maximum positive value ("TotBhsMax") when the magnitude of the magnetic field (|MagF|) is algebraically added to the EFhs. In other words, when the magnetic field MagF (generated by magnets 54) is aligned with the hs direction, a maximum value of the total field TotBhs will be produced. Similarly, when the magnetic field MagF "points down," i.e., is pointed in the opposite direction (180°) of the hs unit vector, the value of TotBhs is a minimum value. Thus:

$$TotBhsMax = EFhs + |MagF| \tag{11}$$

$$TotBhsMin = EFhs - |MagF| \tag{12}$$

These two equations are readily solved to give:

$$EFhs = (TotBhsMax + TotBhsMin)/2 \tag{13}$$

$$|MagF| = (TotBhsMax - TotBhsMin)/2 \tag{14}$$

In reference to FIG. 8B, a plot of TotBrs (i.e., the Total magnetic field projected onto the right side unit vector) as a function of the outer drill rod rotation angle is shown. Similar relationships (eqns. 11-14) hold for the right side components of TotBrs:

$$TotBrsMax = EFrs + |MagF| \tag{15}$$

$$TotBrsMin = EFrs - |MagF| \tag{16}$$

These two equations are readily solved to give:

$$EFrs = (TotBhsMax + TotBrsMin)/2 \tag{17}$$

$$|Mag| = (TotBrsMax - TotBrsMin)/2 \tag{18}$$

Referring back to FIG. 7, the relationships derived above (EFhs, EFrs and EFz) can be combined to form the Earth field vector EF:

$$EF = EFhs*hs + EFrs*rs + EFz*z \tag{19}$$

The procedure disclosed above to determine the EFhs and EFrs components by rotating the outer drill rods 50 and applying equations (11) . . . (19) can be considered a calibration procedure to determine the Earth's magnetic field components in the borehole interval near the tracking instrument 40. This calibration procedure can be carried out whether the inner drill rod 36 is rotating or not. Thus the Earth's magnetic field in the borehole high side, right side, z representation which is fixed relative to the Earth can be determined during normal drilling operations with the inner drill rods 36 are rotating provided the outer drill rods 50 are rotated one or more revolutions to enable evaluating equations (11)-(18) from time to time.

Once the EFhs and EFrs are known the Maghs and Magrs vector components can be computed from Equations (8) and (9), which also are independent of the rotation of the inner drill rods 36, we obtain $$Mag Fhs = Tot Bhs - EFhs \qquad (20)$$

$$Mag Frs = Tot Brs - EFrs \qquad (21)$$

The roll angle AhsMag of the outer drill rod is then found from:

$$AhsMag F = a\tan 2(Mag Frs, Mag Fhs) \qquad (22)$$

AhsMagF can be continually computed during drilling operations and displayed on a drillers console during drilling operations shortly after a calibration measurement has been made.

If the intent is to drill straight ahead, the inner and outer drill rods are rotated simultaneously with the inner drill rods 36 probably rotating faster than the outer drill rods 50. If a drilling direction correction is to be made, the outer drill rods 50 are held fixed at the drilling apparatus 16 while the drill bit 38 is rotated by drilling motor 53. The angle of the high side to the tool face must be set appropriately, i.e., the roll angle of the outer drill rod must be adjusted to make the drill bend 25 point in the prescribed direction 20. This is accomplished by determining the roll angle of the axis of the magnets (AhsMagF), i.e., the direction of the MagF vector. The angle between the drill rod bend 25 and the magnet axis MagAx 170 (FIG. 3) is predetermined—by measuring this offset angle—before the drilling assembly is deployed in the field. Thus, these data are typically stored in processor memory.

Figure 9:
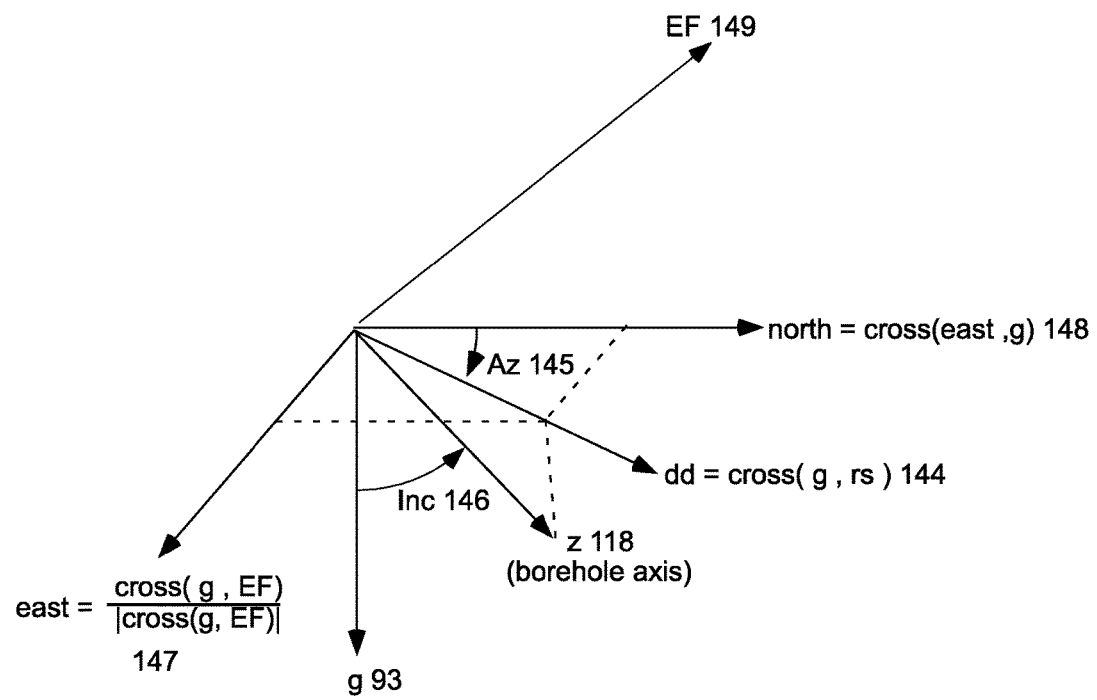
FIG. 9 is a diagrammatic depiction defining the relationship between various vectors used for computing borehole orientation in accordance with an embodiment of the present invention.

Referring to FIG. 9, a diagrammatic depiction defining the relationships between various vectors used for computing borehole orientation is disclosed. Specifically, this view shows the vector relationships between the gravity vector (g), the Earth field vector (EF), the East and North directions, the borehole axis (z-axis), the drilling direction (dd), the Azimuth angle (Az), and the borehole inclination angle (Inc). (Again, the drilling direction (dd) vector is the projection of the borehole axis (z-axis) onto the Earth's surface).

This diagram defines the east direction, i.e., a unit vector in the horizontal East direction. This east vector is perpendicular to the plane of EF and G, thus defines a unit vector in the gravity direction $$g = G/|G| = (Gx^*x + Gy^*y + Gz^*z)/\sqrt{Gx^2 + Gy^2 + Gz^2} \qquad (23)$$

$$east = cross(g,EF)/|cross(g,EF)| \qquad (24)$$

The horizontal north unit vector is perpendicular to both g and east, and thus:

$$north = cross(east, g) \qquad (25)$$

The drilling direction (dd)

$$dd = cross(g, rs) \qquad (26)$$

is the projection of the borehole axis (z) on the horizontal plane, i.e., the plane perpendicular to g can be written as indicated in (26). The Anorthdd which is the same as the Az angle is then readily found from $$Az = A\text{northdd} = a\tan 2(\text{dot}(dd, east), \text{dot}(dd, north)) \qquad (27)$$

Wherein "a tan 2" is the 4 quadrant inverse tangent function, it has two arguments; in this case, the borehole axis (z) projected in the east direction, and the borehole axis (z) projected in the north direction.

Figure 10:
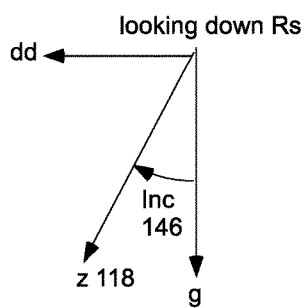
FIG. 10 is a detailed diagrammatic depiction showing the relationship between various vector elements used for computing borehole inclination angle in accordance with an embodiment of the invention.

Referring to FIG. 10, a detailed diagrammatic depiction shows the relationship between various vector elements used for computing borehole inclination angle. To be specific, this view shows the elements from which the inclination angle (Inc) is computed. The inclination angle (Inc) is given by:

$$Inc = a\tan 2(\text{dot}(z, dd), \text{dot}(z, g)) \qquad (28)$$

Figure 11:
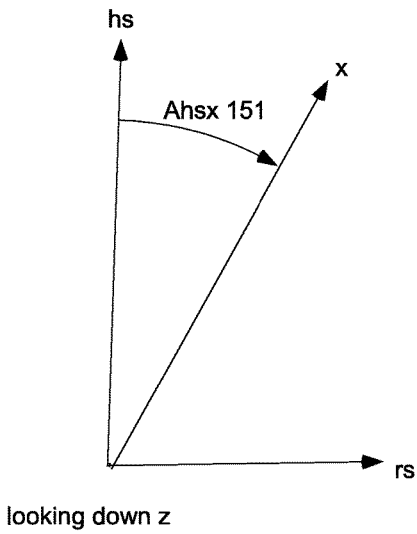
FIG. 11 is a detailed diagrammatic depiction showing the relationship between various vector elements used for computing a roll angle of the inner drill rod in accordance with an embodiment of the invention.
Figure 12:
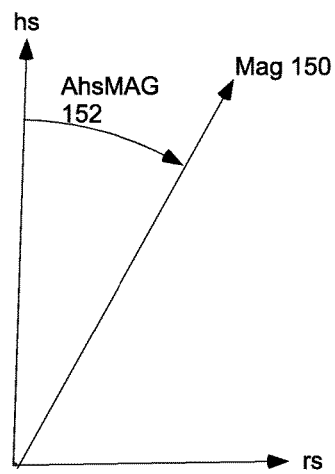
FIG. 12 is a detailed diagrammatic depiction showing the relationship between various vector elements used for computing a roll angle of the outer drill rod in accordance with an embodiment of the invention.

Referring to FIG. 11, a detailed diagrammatic depiction showing the relationship between various vector elements used for computing a roll angle of the inner drill rod is disclosed. This view shows the elements from which the Ahsx angle, i.e. the roll angle of the inner drill rod is computed. The roll angle (Ahsx) of the inner drill rod is given by:

$$Ahsx = a\tan 2(\text{dot}(x, rs), \text{dot}(x, hs)) \qquad (29)$$

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A system for determining an azimuthal and inclination direction of a borehole and a tool face orientation of a drill bit in the borehole being drilled by a borehole drilling mechanism comprising an inner drill rod carrying a drill bit and an outer drill rod coaxial to the inner drill rod and including a bent sub near the drill bit, wherein the inner drill rod is rotated independently of the outer drill rod, the system comprising:

a tracking instrument sensor assembly mounted on the borehole drilling mechanism, the tracking instrument sensor assembly including,
a first sensor assembly configured to obtain a gravity field measurement;
a second sensor assembly configured to obtain a magnetic field measurement;
wherein both the first and second sensor assemblies are mounted near the drill bit carried by the inner drill rod; and
a magnetic field generator carried by the outer coaxial drill rod configured to generate a magnetic field at a site of the magnet field measurement;
wherein the system determines the azimuthal and inclination direction of the tracking instrument sensor assembly in the borehole and the tool face orientation of the inner drill rod carrying the drill bit relative to the bent sub of the outer drill rod by a method comprising:
measuring a total magnetic field based on the magnetic field generator and the second sensor assembly;
from the measurement of the total magnetic field, separating vector components of the generated magnetic field from an Earth' s magnetic field;
using the vector components of the Earth's magnetic field and a gravity field measurement from the first sensor assembly to determine the azimuthal direction of drilling of the borehole; and
using the vector components of the generated magnetic field to determine a rotation angle between the outer drill rod and orientation of the inner drill rod.

2. The system of claim 1, further comprising a bent sub coupled to the outer coaxial drill rod.

3. The system of claim 2, further comprising the drill bit disposed within the bent sub.

4. The system of claim 1, further comprising a first motor and a second motor, the first motor coupled to the inner drill rod and the second motor coupled to the outer coaxial drill rod.

5. The system of claim 1, further comprising a telemetry wire disposed within the inner drill rod.

6. The system of claim 5, wherein the telemetry wire operably connects the borehole drilling mechanism to a computer having a processor with a data analysis module.

7. The system of claim 1, wherein said magnetic field extends from an upper permanent magnet on the outer coaxial drill rod to a lower permanent magnet on the outer coaxial drill rod.

8. The system of claim 1, wherein the first sensor assembly further comprises an accelerometer module.

9. The system of claim 1, wherein the magnetic field is generated by one or more permanent magnets.

10. A system for determining an azimuthal and inclination direction of a borehole and a tool face orientation of a drill bit in the borehole being drilled by a borehole drilling mechanism comprising an inner drill rod carrying a drill bit and an outer drill rod coaxial to the inner drill rod and including a bent sub near the drill bit, wherein the inner drill rod is rotated independently of the outer drill rod, the system comprising:
a tracking instrument sensor assembly mounted on the borehole drilling mechanism, the tracking instrument sensor assembly including,
a first sensor assembly configured to obtain a gravity field measurement;
a second sensor assembly configured to obtain a magnetic field measurement;
wherein both the first and second sensor assemblies are mounted near a drill bit carried by the inner drill rod; and
a magnetic field generator carried by the outer coaxial drill rod configured to generate a magnetic field at a site of the magnet field measurement;
a telemetry wire disposed within the inner drill rod; and
wherein the system determines the azimuthal and inclination direction of the tracking instrument sensor assembly in the borehole and the tool face orientation of the inner drill rod carrying the drill bit relative to the bent sub of the outer drill rod by a method comprising:
measuring a total magnetic field based on the magnetic field generator and the second sensor assembly;
from the measurement of the total magnetic field, separating vector components of the generated magnetic field from an Earth's magnetic field;
using the vector components of the Earth's magnetic field and a gravity field measurement from the first sensor assembly to determine the azimuthal direction of drilling of the borehole; and
using the vector components of the generated magnetic field to determine a rotation angle between the outer drill rod and orientation of the inner drill rod.

11. The system of claim 10, further comprising a computer remote from the drill bit operably connected to the telemetry wire.

12. The system of claim 11, wherein the telemetry wire transmits digital data indicative of the magnetic field measurement and the gravity field from the second sensor to the computer.

13. The system of claim 11, wherein the computer comprises a data analysis module configured to calculate the azimuthal direction based at least in part on data from the first sensor and the second sensor assemblies.

14. A method for controlling drilling direction of a borehole comprising an azimuthal and inclination direction of the borehole and a tool face orientation between specified borehole entry and exit locations, comprising the steps of:
providing a system comprising a tracking instrument sensor assembly mounted on a borehole drilling mechanism comprising an inner drill rod carrying a drill bit and an outer drill rod coaxial to the inner drill rod and including a bent sub near the drill bit, wherein the inner drill rod is rotated independently of the outer drill rod, the tracking instrument sensor assembly including,
a first sensor assembly configured to obtain a gravity field measurement;
a second sensor assembly configured to obtain a magnetic field measurement;
wherein both the first sensor and the second sensor are mounted near a drill bit carried by the inner drill rod; and
a magnetic field generator at a site of the magnet field measurement;
a telemetry wire disposed within the inner drill rod and connected to a computer having a processor; and
wherein the system determines the azimuthal and inclination direction of the tracking instrument sensor assembly in the borehole and the tool face orientation of the inner drill rod carrying the drill bit relative to the bent sub of the outer drill rod by the processor executing steps comprising:
receiving sensor data from both the first sensor and the second sensor via the telemetry wire;
measuring a total magnetic field based on the magnetic field generator and the second sensor assembly;
from the measurement of the total magnetic field, separating vector components of the generated magnetic field from an Earth's magnetic field;
using the vector components of the Earth's magnetic field and a gravity field measurement from the first sensor assembly to determine the azimuthal direction of drilling of the borehole; and
using the vector components of the generated magnetic field to determine a rotation angle between the outer drill rod and orientation of the inner drill rod.

15. The system of claim 14, further comprising the step of steering the borehole drilling mechanism based on the determined azimuthal direction.

16. The system of claim 14, further comprising the step of driving a motor to rotate the outer coaxial drill rod by one or more complete revolutions to calibrate the system.

17. The system of claim 14, further comprising the step of drilling via the system under an obstacle.

* * * * *